United States Patent
Cooper (10) Patent No.: US 11,229,082 B2
(45) Date of Patent: Jan. 18, 2022

(54) CONTROLLED INTERRUPTIONS TO WIRELESS SIGNALLING

(71) Applicant: DISPLAYLINK (UK) LIMITED, Cambridge (GB)

(72) Inventor: Patrick David Cooper, Cambridgeshire (GB)

(73) Assignee: DISPLAYLINK (UK) LIMITED, Cambridge (GB)

(*) Notice: Subject to any disclaimer, the term of this patent is extended or adjusted under 35 U.S.C. 154(b) by 10 days.

(21) Appl. No.: 16/651,395

(22) PCT Filed: Sep. 18, 2018

(86) PCT No.: PCT/GB2018/052667
§ 371 (c)(1),
(2) Date: Mar. 27, 2020

(87) PCT Pub. No.: WO2019/063975
PCT Pub. Date: Apr. 4, 2019

(65) Prior Publication Data
US 2020/0305217 A1    Sep. 24, 2020

(30) Foreign Application Priority Data
Sep. 28, 2017  (GB) .................................... 1715731

(51) Int. Cl.
*H04W 76/20*  (2018.01)
*H04B 7/06*   (2006.01)
*H04W 52/02*  (2009.01)

(52) U.S. Cl.
CPC .......... *H04W 76/20* (2018.02); *H04B 7/0617* (2013.01); *H04W 52/0209* (2013.01)

(58) Field of Classification Search
CPC . H04B 7/0617; H04W 76/20; H04W 52/0209
See application file for complete search history.

(56) References Cited

U.S. PATENT DOCUMENTS

2004/0125869 A1   7/2004  May
2012/0075743 A1*  3/2012  Horiguchi ............. G06F 1/3278
                                                   360/75

(Continued)

FOREIGN PATENT DOCUMENTS

| EP | 2582187 A2 | 4/2013 |
| WO | 2007013934 A2 | 2/2007 |
| WO | 2017120318 A1 | 7/2017 |

OTHER PUBLICATIONS

International Search Report dated Dec. 17, 2018 for corresponding International Application No. PCT/GB2018/052667.

(Continued)

*Primary Examiner* — Chi H Pham
*Assistant Examiner* — Weibin Huang
(74) *Attorney, Agent, or Firm* — Paradice & Li LLP (57) ABSTRACT

A method for mitigating intentional potential interruptions in data signal communication, the method comprising transmitting (S21) or receiving (S23) a data signal, determining when a portion of the data signal has been successfully transmitted (S22) or received (S24), when the portion of the data signal has been successfully transmitted or received, generating (S25) a transmission interruption signal, and in response to the transmission interruption signal, performing one or more maintenance operations, such as beamforming, that may potentially interrupt transmission or reception of the data signal.

18 Claims, 5 Drawing Sheets

(56) References Cited

U.S. PATENT DOCUMENTS

| | | |
|---|---|---|
| 2012/0119953 A1 | 5/2012 | Hosoya |
| 2012/0314663 A1* | 12/2012 | Dwivedi .............. H04L 1/1816 370/329 |
| 2014/0016495 A1* | 1/2014 | Li ....................... H04B 7/0408 370/252 |
| 2017/0195016 A1* | 7/2017 | Alexander ........... H04L 1/1671 |
| 2018/0026696 A1* | 1/2018 | Hansen ................... H01Q 3/26 370/336 |

OTHER PUBLICATIONS

GB Search Report dated Feb. 27, 2018 for corresponding GB Application No. 1715731.4.
GB Search Report dated Feb. 24, 2020 for corresponding GB Application No. 1715731.4.

* cited by examiner

CONTROLLED INTERRUPTIONS TO WIRELESS SIGNALLING

RELATED APPLICATIONS

The present application is a U.S. National Stage application under 35 USC 371 of PCT Application Serial No. PCT/GB2018/052667, filed on 18 Sep. 2018; which claims priority from GB Patent Application No. 1715731.4, filed 28 Sep. 2017, the entirety of both of which are incorporated herein by reference.

BACKGROUND

It is now possible to connect virtual-reality headsets to host computing devices over a wireless connection. This is beneficial because it allows a user greater mobility and therefore a more immersive experience, but it introduces problems due to unreliability of the wireless connection. In particular, in a virtual-reality context, to avoid the effect of the image being displayed "sticking" it is essential that the data, whether audio, visual, or both, be updated at a high rate. Typically, the rates used are higher than on conventional desktop displays.

Some high-performance wireless transmission systems use a directional beam to transmit data. In the case of a virtual reality device, the target for the wireless transmission beam is in motion, and therefore the system must undergo "beamforming" so that the transmitter at the content source—the host device—and the receiver at the content sink—the virtual reality device—direct the beam in the right direction to optimise the connection throughput.

Beamforming will disrupt the data throughput on the wireless connection by periodically blocking the data throughput for short periods. Due to the previously-mentioned high data rates required in a virtual-reality system, even a short interruption may result in lost or late data, such as a video frame, since new video frames, for example, must be delivered at 11 ms or shorter intervals. These interruptions result in disruptive visual artefacts.

The invention therefore seeks to avoid or at least mitigate these problems.

SUMMARY

Accordingly, in one aspect, the invention provides a method for mitigating intentional potential interruptions in data signal communication, the method comprising:
 transmitting or receiving a data signal;
 determining when a portion of the data signal has been successfully transmitted or received;
 when the portion of the data signal has been successfully transmitted or received, generating a transmission interruption signal; and
 in response to the transmission interruption signal, performing one or more maintenance operations that may potentially interrupt transmission or reception of the data signal.

In a preferred embodiment, the data signal is received at a receiving device, the receiving device determines whether the portion of the data signal has been successfully received, and the receiving device generates the transmission interruption signal when the portion of the data signal has been successfully received. Preferably, the receiving device generates the transmission interruption signal when the portion of the data signal has been successfully received and if a subsequent portion of the data signal has not started to be received. In response to the transmission interruption signal, the receiving device may perform one or more maintenance operations that may potentially interrupt reception of the data signal. In an embodiment, the receiving device transmits the transmission interruption signal to a transmitting device, and, in response to the transmitting device receiving the transmission interruption signal, the transmitting device performs one or more maintenance operations that may potentially interrupt transmission of the data signal. The receiving device may transmit the transmission interruption signal to a transmitting device, wherein the transmitting device determines whether the portion of the data signal has been successfully transmitted, and, in response to the transmitting device receiving the transmission interruption signal and to determining that the portion of the data signal has been successfully transmitted, the transmitting device performs the one or more maintenance operations.

In a preferred embodiment, the data signal is transmitted from a transmitting device, the transmitting device determines whether the portion of the data signal has been successfully transmitted, and the transmitting device generates the transmission interruption signal when the portion of the data signal has been successfully transmitted. Preferably, the transmitting device generates the transmission interruption signal when the portion of the data signal has been successfully transmitted and if a subsequent portion of the data signal has not started to be transmitted. In response to the transmission interruption signal, the transmitting device may perform one or more maintenance operations that may potentially interrupt transmission of the data signal. In an embodiment, the transmitting device transmits the transmission interruption signal to a receiving device, and, in response to the receiving device receiving the transmission interruption signal, the receiving device performs one or more maintenance operations that may potentially interrupt reception of the data signal. The transmitting device may transmit the transmission interruption signal to a receiving device, wherein the receiving device determines whether the portion of the data signal has been successfully received, and, in response to the receiving device receiving the transmission interruption signal and to determining that the portion of the data signal has been successfully received, the receiving device performs the one or more maintenance operations.

According to one embodiment, after it is determined that the portion of the data signal has been successfully transmitted or received, the method further comprises determining whether the performance of the one or more maintenance operations can be completed before a next portion of the data signal will be due to be transmitted or received and generating the transmission interruption signal if it is determined that the performance of the one or more maintenance operations can be completed with the time period. Determining whether the performance of the one or more maintenance operations can be completed before a next portion of the data signal will be due to be transmitted or received may comprise using a schedule of times of expected transmission and/or reception, and/or may comprise using a schedule of time periods required for particular maintenance operations.

According to another embodiment, the method may further comprise:
 determining a level of disruption to a user if the next portion of the data signal is not transmitted or received on time;
 determining a level of disruption to the user if the performance of the one or more maintenance operations is not carried out;

determining whether the level of disruption if the performance of the one or more maintenance operations is not carried out is higher than the level of severity of disruption if the next portion of the data signal is not transmitted or received on time; and generating the transmission interruption signal if it is determined that the level of disruption if the performance of the one or more maintenance operations is not carried out is higher than the level of severity of disruption if the next portion of the data signal is not transmitted or received on time.

Preferably, in response to the transmission interruption signal, the method comprises stopping reception of the data signal and/or transmission of the data signal. Preferably, when the one or more maintenance operations is complete, the method comprises starting reception of the data signal and/or transmission of the data signal.

The portion of the data signal may be a frame of image data, and/or may be sufficient to fill a buffer of audio data.

The one or more maintenance operations may comprises any one or more of:
- beamforming;
- transmission/reception channel changing;
- entering a power-reduced mode of operation;
- entering a sleep mode of operation.

According to a second aspect, the invention provides a receiving device configured to perform a method as described above.

According to a third aspect, the invention provides a transmitting device configured to perform a method as described above.

According to a fourth aspect, the invention provides system comprising a receiving device and a transmitting device configured to perform a method as described above.

According to a still further aspect, the invention may provide a method for a transmitting device to control interruptions to a wireless connection to avoid delays in transmission of data. The method may, comprise:
1. A process determining that a portion of data has been successfully transmitted
2. The process signalling to the radio that the connection can be interrupted
3. If maintenance is required, the radio interrupting transmission
4. The radio performing maintenance
5. The radio reinstating normal transmission Maintenance may comprise beamforming, shutting down the radio to save power, changing channel, or other such functionality that may cause an interruption in data transmission.

There may also be provided a corresponding method for a receiving device to control interruptions to a wireless connection to avoid corruption of data, comprising:
1. A process determining that a portion of data has been successfully received
2. The process signalling to the radio that the connection can be interrupted
3. If maintenance is required, the radio stopping receiving data
4. The radio performing maintenance
5. The radio beginning to receive data normally Maintenance may comprise beamforming, shutting down the radio to save power, changing channel, or other such functionality that may cause an interruption in data receipt.

These methods can be combined such that the transmitting and receiving devices co-ordinate to interrupt the connection simultaneously. This is the most beneficial as it means that there is less chance of the transmitting device attempting to transmit data while the receiving device is inactive or the receiving device wasting power by activating its radio when no data is being transmitted.

As an extension, a process may provide a schedule to the radio, allowing prediction of when the connection can next be interrupted. This will be less accurate, but can allow improved determination of whether maintenance should be carried out immediately or can be delayed until the next optimal time for an interruption.

As a further extension, a process may indicate to the radio when the next data transmission will begin, thus further improving prediction and making it less likely that a radio will still be inactive when it is next required.

These methods allow breaks in transmission to be co-ordinated with the transmission and receipt of data to minimise the impact on a stream. The most beneficial uses for such methods are in video and audio systems, both of which have low tolerance for interruptions as a user will notice lost display or audio data in the form of "judder" in a video or "skipping" in audio. The largest benefits are in virtual-reality systems using compressed video, in which the pattern of transmission is periodic and the data transmitted is not identical in each period, and furthermore any judder will be extremely noticeable.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1:
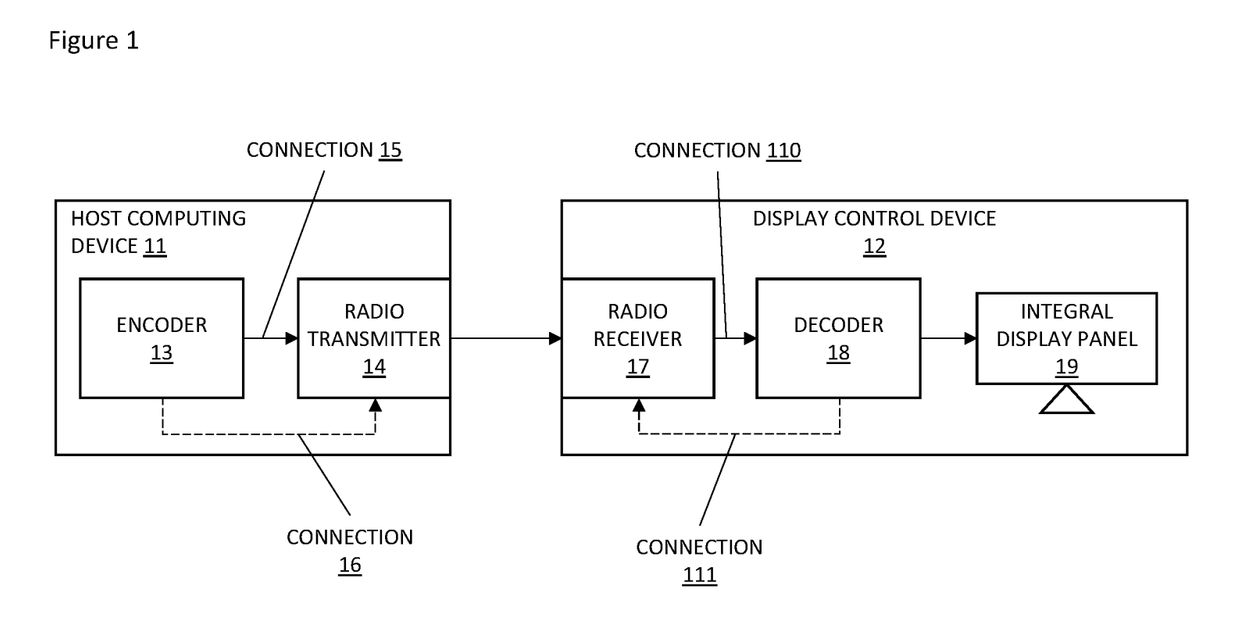
FIG. 1 shows a block diagram of a display system.

FIG. 1 shows a host computing device [11] connected to a display control device [12] with an integral display panel [19]. In this example, the display control device [12] is a head-mounted display device such as a set of virtual-reality goggles. It is beneficial for these to be wirelessly connected to the host computing device [11], which in this example may be a gaming console.

The host device [11] contains an encoder [13] which generates data for transmission. This may be an application which generates the data originally, or it may be an encoding or compression process which receives the data and applies further processing. In any case, the application, known herein as an encoder, is connected to a radio transmitter [14]. Two connections [15, 16] are shown in FIG. 1, of which one connection [15] is used for sending data to the radio transmitter [14] for transmission and the other is used for signalling between the encoder [13] and the radio transmitter [14]. In practice, these connections [15, 16] are likely to use the same physical connection, but they are shown separately here for clarity.

The host device [11] is connected to the display control device [12] via a wireless connection [112] which is specifically between the radio transmitter [14] on the host device [11] and a radio receiver [17] on the display control device [12]. In practice, both the transmitter [14] and the receiver [17] are likely to fulfil both functions, as transceivers, but they are described herein as a separate transmitter [14] and receiver [17] for simplicity.

The radio receiver [17] on the display control device [12] is connected to a further process [18], which may be a decoder, which prepares the received data for display on the display panel [19]. This may mean, for example, decompressing or decoding the received data and/or converting it from a transmission format to a format suitable for sending to the display panel [19]. As on the host device [11], two connections [110, 111] are shown between the decoder [18] and the radio receiver [17], of which one connection [110] is used for passing received data from the radio receiver [17] to the decoder [18] and the other is used for signalling between the decoder [18] and the radio receiver [17].

The decoder [18] is also connected to the display panel [19] to send the decoded data to be displayed.

In a context such as a virtual-reality headset [12] connected to a gaming console [11], the display control device [12] is likely to move relative to the host device [11]. This means that it is necessary for the host device [11] to regularly recalibrate the wireless connection [112] to ensure that it will be strongest in the direction of the display control device [12]. As mentioned above, this is known as beamforming and causes an interruption in data transmission while it is in progress. Conventionally, the timing of beamforming is determined by the radio transmitter [14]. However, according to some embodiments of the invention, the methods may involve the applications [13, 18] signalling to their respective radio transmitter or receiver [14, 17] when beamforming should occur in order to avoid or reduce interruption.

Figure 2:
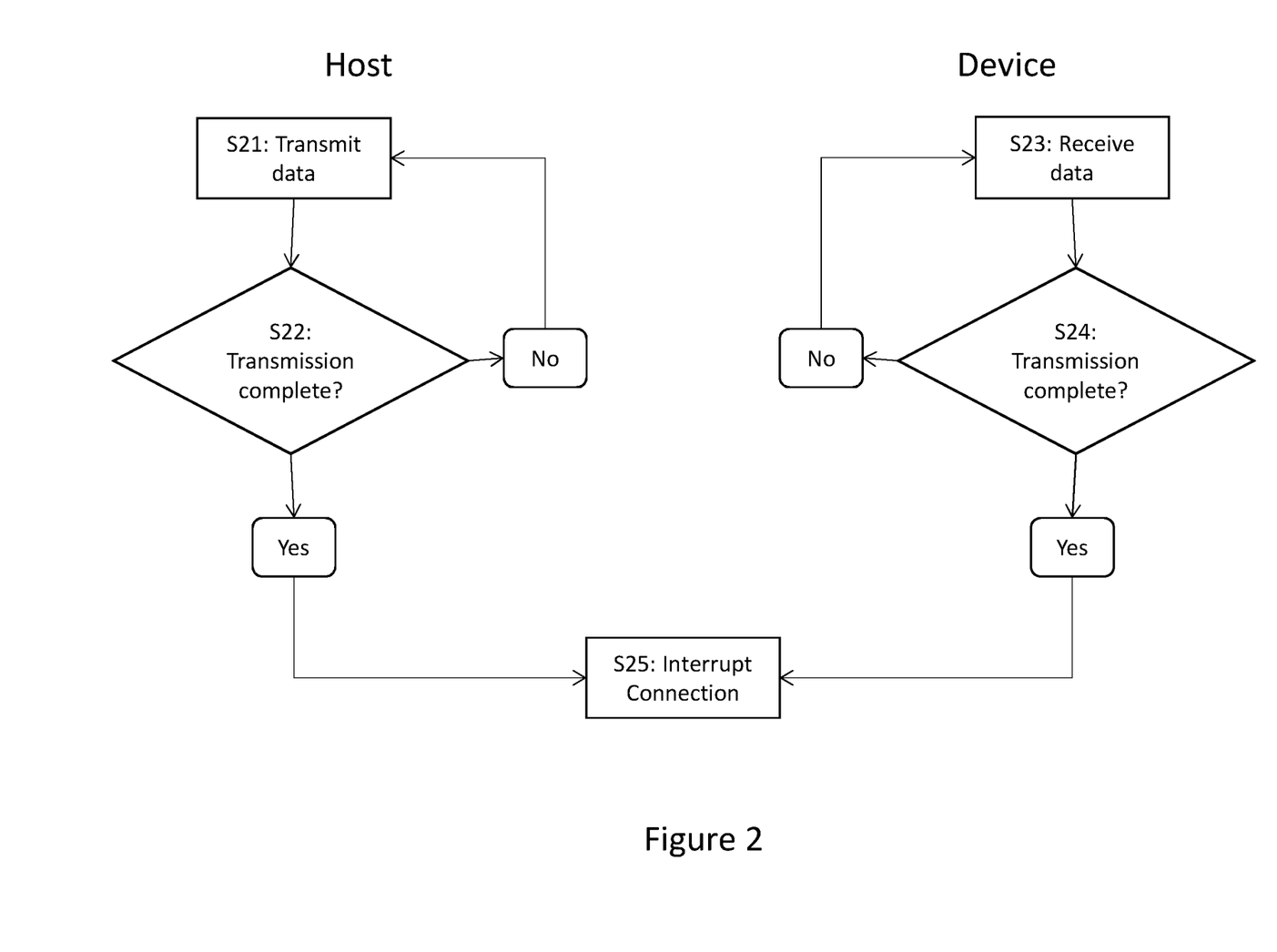
FIG. 2 shows an example process.

FIG. 2 shows an example process by which the encoder [13] and decoder [18] can control the radio transmitter and receiver [14, 17]. This embodiment of the method assumes that the interruption to the connection will be bilateral as both radio transmitter and receiver [14, 17] will interrupt the connection [112] simultaneously. However, one side of the process or the other may be carried out in isolation to create a unilateral method.

At Step S21, the encoder [13] passes data to the radio transmitter [14] to be transmitted to the display control device [12]. The radio transmitter [14] transmits the data to the radio receiver [17] on the display control device [12] without interruption even if its internal processes indicate that it should interrupt the connection [112] for maintenance such as beamforming.

Optionally, there may be an override function in the radio transmitter [14] such that if the encoder [13] does not permit an interruption for more than a predetermined length of time the radio transmitter [14] may interrupt the connection [112] regardless.

After each unit of data, for example a tile of display data, or a specific portion of audio data has been transmitted, the encoder [13] determines whether transmission is complete at Step S22. This is likely to mean that the whole of a larger portion of display data such as a frame has been transmitted, and this determination may, in some embodiments, involve waiting for an acknowledgement signal from the display control device [12]. If transmission is not complete, the encoder [13] continues to transmit data and returns to Step S21, continuing to loop through these two steps until transmission is complete.

If transmission is complete, the encoder [13] sends a signal [16] to the radio transmitter [14] that it would be appropriate to interrupt the connection [112]. The transmitter [14] then stops transmitting data, if necessary, and may perform beamforming, and/or other maintenance functions that may interrupt the connection [112], such as shutting down to save power or allowing the transmitter [14] to cool, as required.

On the display control device [12], a similar process is used. The radio receiver [17] receives data transmitted by the host device [11] at Step S23 and passes it to the decoder [18]. At Step S24, the decoder [18] determines whether the transmission is complete: i.e. whether the entire portion of data, in this case a frame of display data, has been transmitted. If not, it continues receiving transmitted data and Steps S23 and S24 continue looping.

If the entire portion of data has been transmitted the decoder [18] sends a signal [111] to the radio receiver [17] indicating that it would be appropriate to interrupt the connection [112] at Step S25. This might mean shutting down to save power, and/or or sending a further signal to the radio transmitter [14] to indicate that it has finished receiving data and beamforming or other maintenance can be carried out.

The signals [16, 111] to interrupt the wireless connection [112] may be simple binary indications of whether the connection [112] can be interrupted, as described here, or they may be more complex. For example, the encoder [13] may provide a schedule to the radio transmitter [14] indicating a time interval during which maintenance should occur, since it may be able to estimate this based on its own knowledge of the length and complexity of a frame being encoded. This will be an estimate and less accurate than a signal sent at the time at which the frame is completed, but it may allow the host [11] to avoid issues with thread timing and may also make it easier to avoid problems with signal strength caused by beamforming being delayed too long or overheating caused by a delay in shutting down the radio transmitter [14] for power management.

Figure 3:
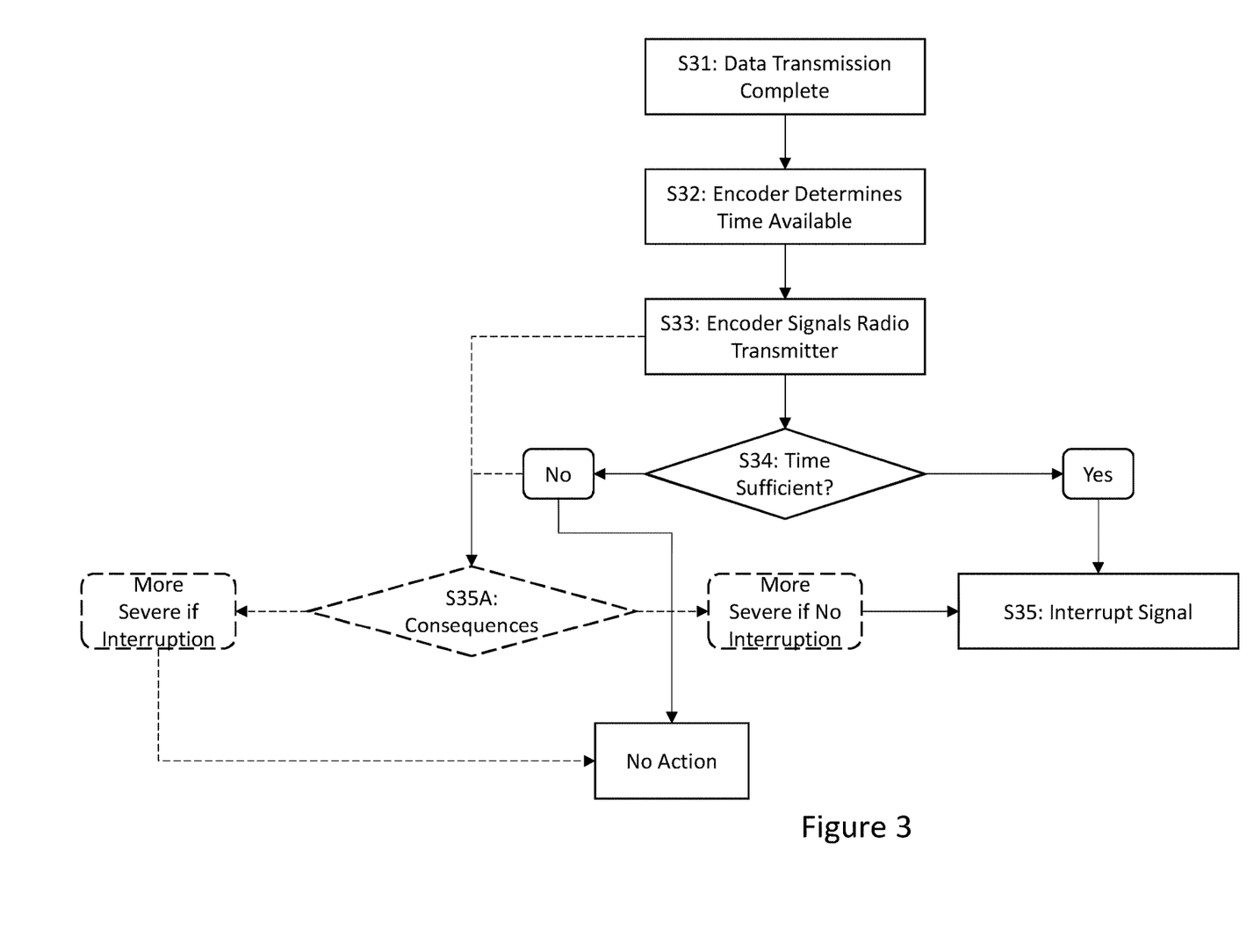
FIG. 3 shows an example process for a more complex method.

As an alternative to this elaboration with a similar effect, also involving a schedule, the encoder [13] might indicate to the radio transmitter [14] when the next data is expected at the time it indicates that transmission is complete. This will allow the radio transmitter [14] to determine whether maintenance can be successfully carried out in the time available. An example decision-making process is shown in FIG. 3.

At Step S31, the encoder [13] finishes data transmission as previously mentioned. Prior to sending a signal to the radio transmitter [14], however, it estimates the time remaining until it will begin transmitting again at Step S32. It then sends an indication of this time to the radio transmitter [14] at Step S33. Optionally, it may also transmit an indication of the level of consequences should the beginning of the next transmission be missed or delayed. If no such indication is provided, the parts of the process outlined in dashed lines are skipped and no further action is taken.

In a first embodiment, in which the encoder [13] provides an indication of the level of consequences should the beginning of transmission be delayed, the radio transmitter [14] may immediately proceed from Step S33 to Step S35A and determine whether the consequences will be more severe if the connection [112] is interrupted or if it is not.

For example, if maintenance has been carried out recently and interrupting the transmission of display data would be extremely disruptive to user experience, the process may follow the branch to the left beginning at "More Severe if Interruption" as the radio transmitter [14] determines that the consequences if the connection [112] is interrupted will be more severe than if they are not. It then takes no action.

If maintenance has not been carried out recently and, for example, the display control device [12] has moved significantly and beamforming is required to maintain acceptable signal strength, the radio transmitter [14] may determine that the consequences will be more severe if beamforming is not carried out and therefore that the consequences of missing or delaying the beginning of the next data transmission are acceptable. It may then proceed to Step S35 and interrupt the connection [112].

In a second embodiment, the radio transmitter [14] is aware of the maintenance required and at least an estimate of how long this maintenance will take but may not have received any indication of the consequences should the beginning of the next transmission be delayed. It therefore determines at Step S34 whether the time period indicated by the encoder [13] will be sufficient for maintenance to be carried out. For example, if beamforming will take 5 ms and the encoder [13] has indicated that data transmission will begin again in 4.5 ms, there will not be time to carry out beamforming and the process follows the NO branch to the left of FIG. 3. If the encoder [13] has provided no indication of the consequences of missing or delaying the beginning of the next data transmission, the process may omit the whole part of the process outlined with dashed lines and the radio transmitter [14] may take no action.

In a third embodiment, in which the encoder has provided an indication of the consequences of missing or delaying the beginning of the next data transmission, once the radio transmitter [14] has determined that there is not enough time to carry out maintenance and the process has proceeded to the NO branch, the process may then proceed to Step S35A and the radio transmitter [14] may determine whether the consequences will be more severe if the connection [112] is interrupted or if it is not, as previously described. Depending on the result of this determination it may then either take no action or proceed to Step S35 and interrupt the connection [112].

Naturally, if at Step S34 it is determined that there was sufficient time before the next data transmission to carry out maintenance, the radio transmitter [14] may proceed directly to Step S35 and disrupt the connection [112] regardless of the consequences should the interruption be delayed.

Figure 4:
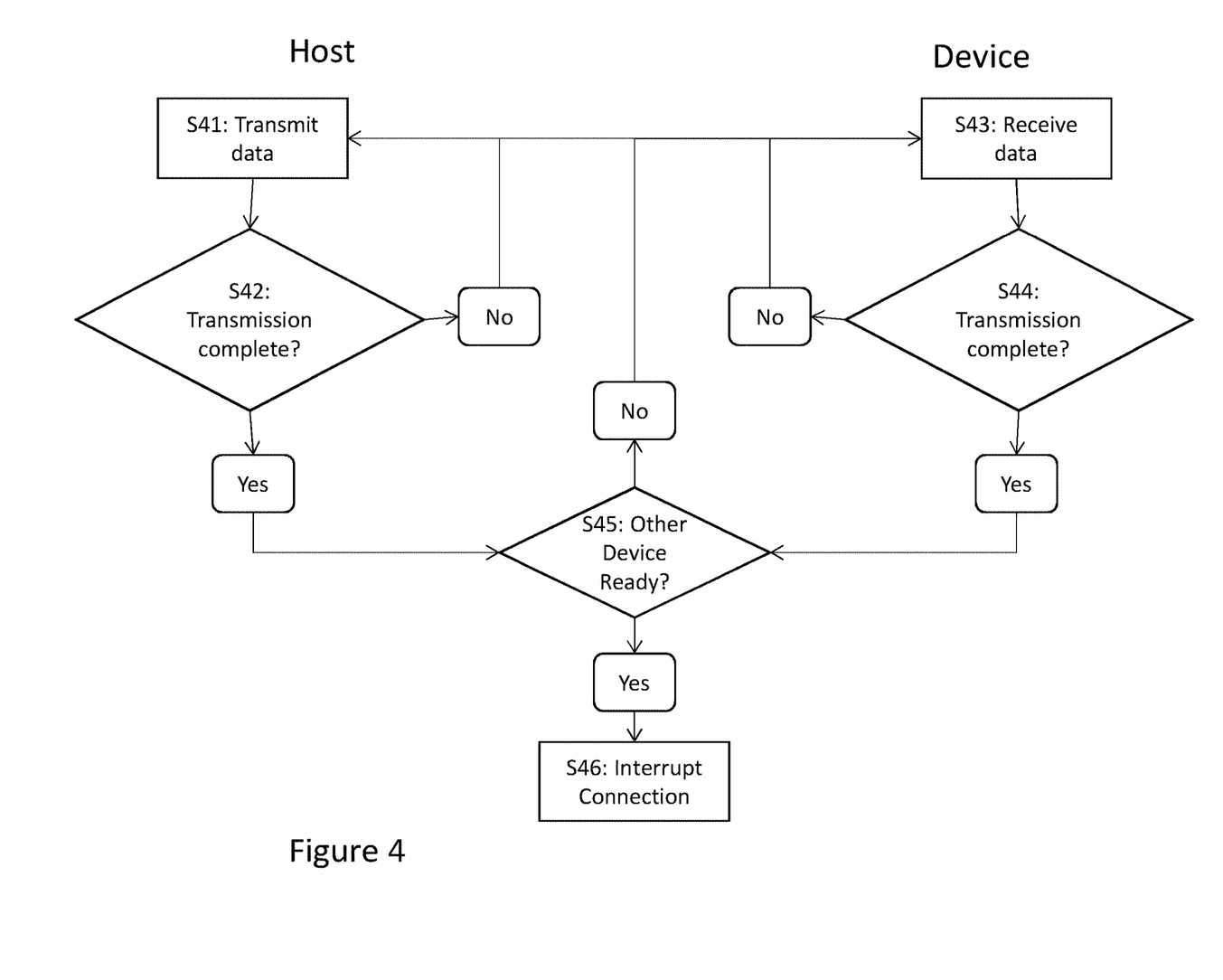
FIG. 4 shows an example process involving confirmation signalling.

FIG. 4 shows an example decision-making process involving confirmation signalling. The first steps of the process are similar to those already described in FIG. 2: At Step S41, the host [11] transmits data to the display control device [12] and at Step S43 the display control device [12] receives it. After each unit of display data is transmitted, the encoder [13] on the host [11] checks whether transmission is complete: for example, whether a whole frame has been successfully transmitted. This may involve waiting for an acknowledgement signal from the display control device [12], but the decision could be made autonomously by the host [11] without any acknowledgement from the display control device [12].

If the transmission is not complete, the process returns to Step S41. Otherwise, the process proceeds to Step S45.

Meanwhile, though not necessarily synchronously, after every unit of data is received the decoder [18] on the display control device [12] determines whether the transmission is complete: for example, whether it has received a whole frame. If not, the process returns to Step S43 and awaits the next unit of data. Otherwise, the process proceeds to Step S45.

At Step S45, each device [11, 12] determines whether the other device [12, 11] is ready for the connection [112] to be interrupted. For example, the encoder [13] or transmitter [14] on the host device [11] may determine whether a final acknowledgement has been received from the display control device [12] in order to determine whether all the data has been received or whether any should be re-transmitted prior to any interruption of the connection [112]. In another example, the decoder [18] or receiver [17] on the display control device [12] may transmit a signal to the host device [11] enquiring whether any more data will be transmitted.

In an embodiment that uses a schedule of data transmission such as those described with reference to FIG. 3, this step may involve both the encoder [13] and decoder [18] checking a schedule and determining from this whether the other device [11, 12] is likely to be ready for the connection to be interrupted.

In any case, if one device [11, 12] is not ready for the connection to be interrupted, the process returns to the beginning and the other device [12, 11] will either transmit further data if available or await the transmission of further data as appropriate. Otherwise, if both devices [11, 12] are ready for the connection to be interrupted, the process proceeds to Step S46 and both the encoder [13] and the decoder [18] send signals [16, 111] to their respective radios [14, 17] to interrupt the connection and carry out appropriate maintenance.

This method improves co-ordination between the devices [11, 12] by ensuring that neither device [11, 12] will shut down its radio transmitter [14] or receiver [17] while the other device [11, 12] may expect to receive or transmit data. It therefore reduces the chance of data being lost due to an interruption to the connection [112].

Figure 5:
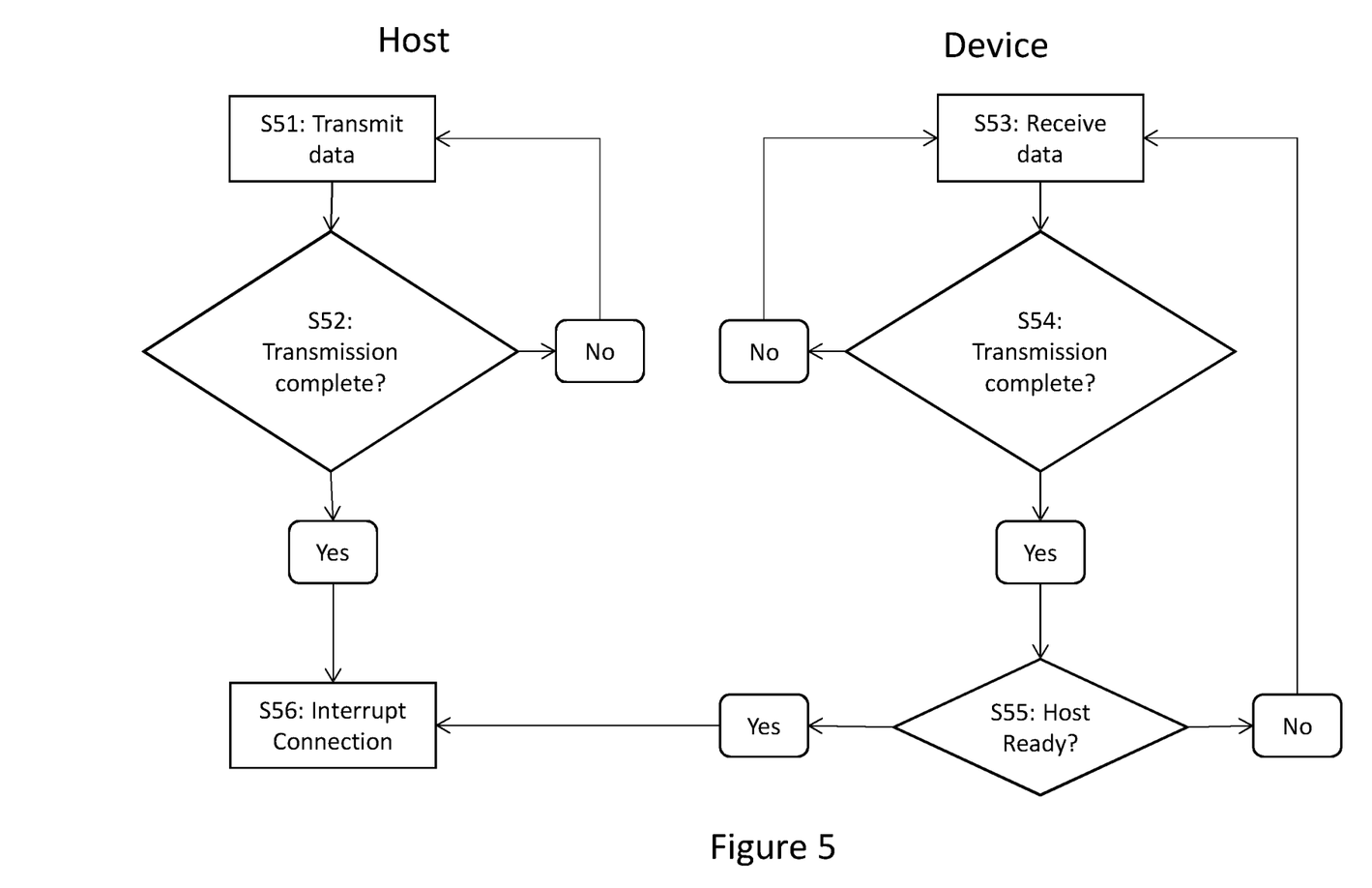
FIG. 5 shows a further example process involving confirmation signalling.

FIG. 5 shows an alternative example of the use of confirmation signalling in the decision-making process. In this example, audio data will be used, but this process may also be used for display data such as that used in the previous examples.

As previously described, at Step S51 the host [11] produces and transmits audio data to the device [12], which in this example may be an audio control device rather than a display control device, and include a set of speakers rather than a display panel [19]. The audio data may still be arranged in packets or other units, and accordingly when each packet is successfully transmitted the encoder [13] on the host [11] determines at Step S52 whether all of a larger unit of audio data has been transmitted. For example, a unit of audio data may be considered complete when a buffer on the host [11] is empty or when the encoder [13] receives an acknowledgement signal from the audio control device [12] indicating that a buffer on the audio control device [12] is full.

If the whole of the larger unit of audio data has been transmitted, the process proceeds to Step S56 and the host [11] interrupts the connection [112] as previously described. Otherwise, the process returns to Step S51 and the host [11] continues to transmit audio data.

The audio control device [12] receives transmitted audio data at Step S53. After receiving each unit of audio data, as previously described, the decoder [18] determines at Step S54 whether it has received the whole of a larger unit of audio data. If not, the process returns to Step S53 and the audio control device [12] continues to receive audio data. If the whole unit of audio data has been received, it may be beneficial to interrupt the wireless connection to perform maintenance, and the process proceeds to Step S55.

If the audio control device [12] unilaterally interrupts the wireless connection [112] without determining whether the host device [11] is ready, the host device [11] may attempt to transmit further data or otherwise communicate with the audio control device [12] during maintenance, which is undesirable. Accordingly, at Step S55 the audio control device [12] signals the host device [11] to determine whether it is ready for an interruption, regardless of whether the host device [11] will power down the radio transmitter [14] and interrupt the connection [112] itself.

If the audio control device [12] determines that the host [11] is not ready for the connection [112] to be interrupted, for example because it will transmit some more audio data imminently, the process returns to Step S53 and the audio control device [12] does not interrupt the connection [112]. If the host [11] is ready for the connection [112] to be interrupted, the process proceeds to Step S56 and the audio control device [12] interrupts the connection [112].

This method improves the effectiveness of a unilateral method of interrupting the connection [112] by turning off one of the radios [14, 17] while reducing the chance of data loss due to one device [11, 12] believing transmission to be complete when the other device [11, 12] is expecting to transmit or receive additional data. It may allow, for example, the audio control device [12] or an analogous display control device to shut down the radio receiver [17] in order to save power and/or cool the receiver [17] even when for other reasons, such as use for transmitting other data over another connection, the host device [11] is not able to shut down the radio transmitter [14].

The process of FIG. 5 has been described under the assumption that the device [12] should only interrupt the connection [112] when the host [11] is prepared for an interruption. Naturally, if appropriate, the ordering may be reversed such that the device [12] can interrupt the connection [112] regardless of the actions of the host [11] and the host [11] must ensure that the device [12] is ready before interrupting the connection [112].

Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and modules which are described as separate may be combined into single modules and vice versa. Functionality of the modules may be embodied in one or more hardware processing device(s) e.g. processors and/or in one or more software modules, or in any appropriate combination of hardware devices and software modules. Furthermore, software instructions to implement the described methods may be provided on a computer readable medium.

The invention claimed is:

1. A method for mitigating intentional potential interruptions in data signal communication, the method comprising:
   transmitting or receiving a data signal;
   determining when a portion of the data signal has been successfully transmitted or received;
   after the portion of the data signal has been successfully transmitted or received, determining whether one or more maintenance operations can be completed before a next portion of the data signal will be due to be transmitted or received using expected transmission and/or reception times and/or using time periods for particular maintenance operations;
   responsive to determining that the one or more maintenance operations can be completed, generating a transmission interruption signal; and
   in response to the transmission interruption signal, performing the one or more maintenance operations that may potentially interrupt transmission or reception of the data signal.

2. The method of claim 1, wherein the data signal is received at a receiving device, the receiving device determines whether the portion of the data signal has been successfully received, and the receiving device generates the transmission interruption signal when the portion of the data signal has been successfully received, optionally wherein the receiving device generates the transmission interruption signal when the portion of the data signal has been successfully received and if a subsequent portion of the data signal has not started to be received.

3. The method of claim 2, wherein, in response to the transmission interruption signal, the receiving device performs one or more maintenance operations that may potentially interrupt reception of the data signal, or wherein the receiving device transmits the transmission interruption signal to a transmitting device, and, in response to the transmitting device receiving the transmission interruption signal, the transmitting device performs one or more maintenance operations that may potentially interrupt transmission of the data signal, or wherein the receiving device transmits the transmission interruption signal to a transmitting device, wherein the transmitting device determines whether the portion of the data signal has been successfully transmitted, and, in response to the transmitting device receiving the transmission interruption signal and to determining that the portion of the data signal has been successfully transmitted, the transmitting device performs the one or more maintenance operations.

4. The method of claim 1, wherein the data signal is transmitted from a transmitting device, the transmitting device determines whether the portion of the data signal has been successfully transmitted, and the transmitting device generates the transmission interruption signal when the portion of the data signal has been successfully transmitted, optionally wherein the transmitting device generates the transmission interruption signal when the portion of the data signal has been successfully transmitted and if a subsequent portion of the data signal has not started to be transmitted.

5. The method of claim 4, wherein, in response to the transmission interruption signal, the transmitting device performs one or more maintenance operations that may potentially interrupt transmission of the data signal, or wherein the transmitting device transmits the transmission interruption signal to a receiving device, and, in response to the receiving device receiving the transmission interruption signal, the receiving device performs one or more maintenance operations that may potentially interrupt reception of the data signal, or wherein the transmitting device transmits the transmission interruption signal to a receiving device, wherein the receiving device determines whether the portion of the data signal has been successfully received, and, in response to the receiving device receiving the transmission interruption signal and to determining that the portion of the data signal has been successfully received, the receiving device performs the one or more maintenance operations.

6. The method of claim 1, further comprising:
   determining a level of disruption to a user if the next portion of the data signal is not transmitted or received on time;
   determining a level of disruption to the user if the performance of the one or more maintenance operations is not carried out;
   determining whether the level of disruption if the performance of the one or more maintenance operations is not carried out is higher than the level of severity of disruption if the next portion of the data signal is not transmitted or received on time; and generating the transmission interruption signal if it is determined that the level of disruption if the performance of the one or more maintenance operations is not carried out is higher than the level of severity of disruption if the next portion of the data signal is not transmitted or received on time.

7. The method of claim 1, further comprising, in response to the transmission interruption signal, stopping reception of the data signal and/or transmission of the data signal.

8. The method of claim 7, further comprising, when the one or more maintenance operations is complete, starting reception of the data signal and/or transmission of the data signal.

9. The method of claim 1, wherein the portion of the data signal is a frame of image data.

10. The method of claim 1, wherein the one or more maintenance operations comprises any one or more of:
beamforming;
transmission/reception channel changing;
entering a power-reduced mode of operation; and
entering a sleep mode of operation.

11. A receiving device comprising:
a processor; and
a computer readable medium coupled to the processor, wherein the computer readable medium comprises instructions which, when executed by the processor, cause the processor to:
receive a data signal;
determine when a portion of the data signal has been successfully received;
after the portion of the data signal has been successfully received, determine whether one or more maintenance operations can be completed before a next portion of the data signal will be due to be received using times of expected reception, and/or using time periods for particular maintenance operations;
responsive to determining that the performance of the one or more maintenance operations can be completed, generate a transmission interruption signal; and
in response to the transmission interruption signal, perform the one or more maintenance operations that may potentially interrupt transmission or reception of the data signal.

12. The receiving device of claim 11, wherein the receiving device generates the transmission interruption signal when the portion of the data signal has been successfully received and if a subsequent portion of the data signal has not started to be received.

13. The receiving device of claim 11, wherein, in response to the transmission interruption signal, the receiving device performs one or more maintenance operations that may potentially interrupt reception of the data signal, or wherein the receiving device transmits the transmission interruption signal to a transmitting device to enable the transmitting device to perform one or more maintenance operations that may potentially interrupt transmission of the data signal.

14. The receiving device of claim 11, wherein the receiving device is further configured to:
determine a level of disruption to a user if the next portion of the data signal is not received on time;
determine a level of disruption to the user if the performance of the one or more maintenance operations is not carried out;
determine whether the level of disruption if the performance of the one or more maintenance operations is not carried out is higher than the level of severity of disruption if the next portion of the data signal is not received on time; and
generate the transmission interruption signal if it is determined that the level of disruption if the performance of the one or more maintenance operations is not carried out is higher than the level of severity of disruption if the next portion of the data signal is not received on time.

15. A transmitting device comprising:
a processor; and
a computer readable medium coupled to the processor, wherein the computer readable medium comprises instructions which, when executed by the processor, cause the processor to:
transmit a data signal;
determine when a portion of the data signal has been successfully transmitted;
after the portion of the data signal has been successfully transmitted, determining whether one or more maintenance operations can be completed before a next portion of the data signal will be due to be transmitted;
responsive to determining that the performance of the one or more maintenance operations can be completed using times of expected transmission, and/or using time periods for particular maintenance operations, generate a transmission interruption signal; and
in response to the transmission interruption signal, perform the one or more maintenance operations that may potentially interrupt transmission or reception of the data signal.

16. The transmitting device of claim 15, wherein the transmitting device generates the transmission interruption signal when the portion of the data signal has been successfully transmitted and if a subsequent portion of the data signal has not started to be transmitted.

17. The transmitting device of claim 15, wherein, in response to the transmission interruption signal, the transmitting device performs one or more maintenance operations that may potentially interrupt transmission of the data signal, or wherein the transmitting device transmits the transmission interruption signal to a receiving device.

18. The transmitting device of claim 15, wherein the transmitting device is further configured to:
determine a level of disruption to a user if the next portion of the data signal is not transmitted on time;
determine a level of disruption to the user if the performance of the one or more maintenance operations is not carried out;
determine whether the level of disruption if the performance of the one or more maintenance operations is not carried out is higher than the level of severity of disruption if the next portion of the data signal is not transmitted on time; and
generate the transmission interruption signal if it is determined that the level of disruption if the performance of the one or more maintenance operations is not carried out is higher than the level of severity of disruption if the next portion of the data signal is not transmitted on time.

* * * * *